(12) United States Patent
Morioka

(10) Patent No.: US 9,423,293 B2
(45) Date of Patent: Aug. 23, 2016

(54) OPTICAL RECEPTACLE AND OPTICAL MODULE

(71) Applicant: Enplas Corporation, Saitama (JP)

(72) Inventor: Shimpei Morioka, Saitama (JP)

(73) Assignee: Enplas Corporation, Saitama (JP)

( * ) Notice: Subject to any disclaimer, the term of this patent is extended or adjusted under 35 U.S.C. 154(b) by 136 days.

(21) Appl. No.: 14/277,127

(22) Filed: May 14, 2014

(65) Prior Publication Data
US 2014/0339403 A1    Nov. 20, 2014

(30) Foreign Application Priority Data

May 15, 2013   (JP) .................................. 2013-102914

(51) Int. Cl.
*G01J 1/04* (2006.01)
*G02B 6/42* (2006.01)
*G01J 1/02* (2006.01)

(52) U.S. Cl.
CPC ............. *G01J 1/0425* (2013.01); *G01J 1/0204* (2013.01); *G01J 1/0407* (2013.01); *G01J 1/0414* (2013.01); *G02B 6/4214* (2013.01); *G02B 6/4286* (2013.01); *G02B 6/4249* (2013.01)

(58) Field of Classification Search
CPC .......... G01B 6/43; G01B 6/262; G01J 1/0425

USPC .................................................... 250/227.11
See application file for complete search history.

(56) References Cited

U.S. PATENT DOCUMENTS 5,661,748 A * 8/1997 Zahavi ................. G02B 27/143
                                                                372/100

FOREIGN PATENT DOCUMENTS

| JP | 2007-171427 A | 7/2007 |
| JP | 2012-194454 A | 10/2012 |
| WO | 2011/077723 A1 | 6/2011 |

* cited by examiner

*Primary Examiner* — Thanh Luu
(74) *Attorney, Agent, or Firm* — Brundidge & Stanger, P.C.

(57) ABSTRACT

The present invention relates to an optical receptacle that can generate monitor light and can be also produced by integral molding, and an optical module having the optical receptacle. The optical receptacle has a first optical face on which light emitted from a light emitting element is incident, reflection surfaces that reflect the light to a light receiving element, a light splitting section that splits the light into monitor light heading for the light receiving element and signal light heading for an end face of an optical fiber, and a second optical face that emits the signal light toward the end face of the optical fiber. The light splitting section has a divided transmission surface and a divided reflection surface. The divided reflection surface is an inclining surface with respect to an optical axis of the light reflected by the reflection surfaces.

16 Claims, 10 Drawing Sheets

PRIOR ART

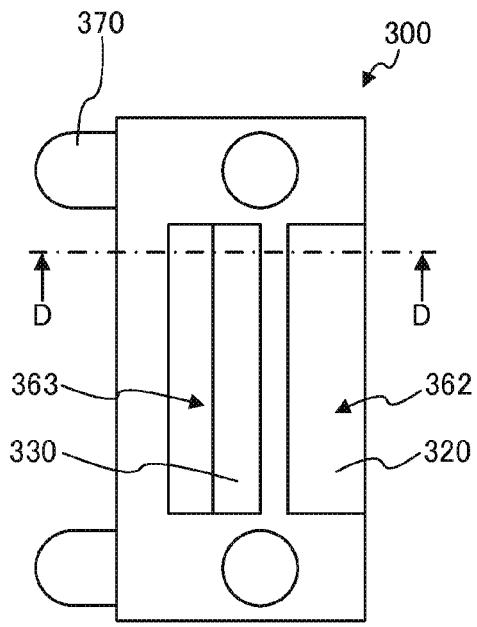
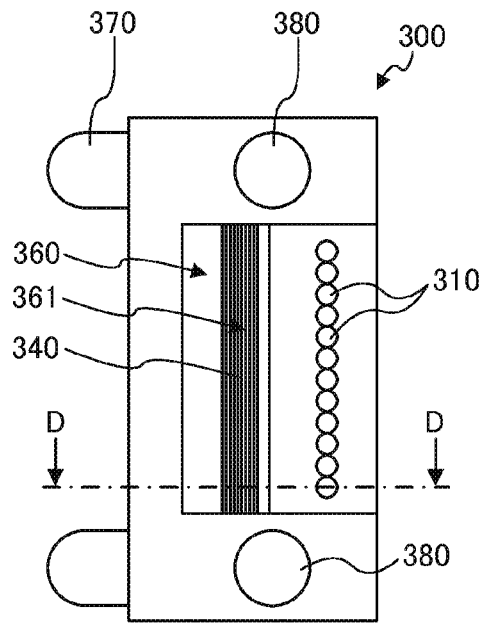
FIG. 3A　　　　　　　　FIG. 3B
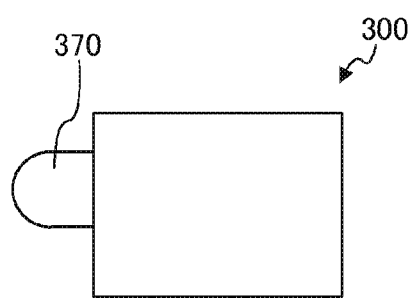
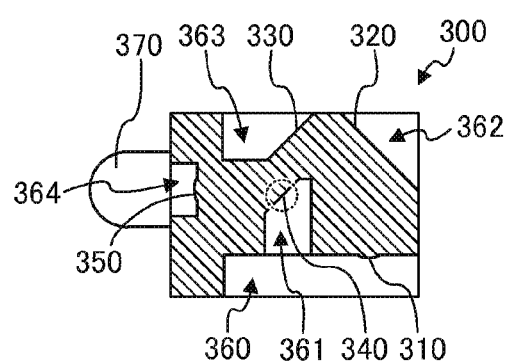
FIG. 3C　　　　　　　　FIG. 3D

OPTICAL RECEPTACLE AND OPTICAL MODULE

CROSS REFERENCE TO RELATED APPLICATIONS

This application is entitled to and claims the benefit of Japanese Patent Application No. 2013-102914 filed on May 15, 2013, the disclosure of which including the specification, drawings and abstract is incorporated herein by reference in its entirety.

TECHNICAL FIELD

The present invention relates to an optical receptacle and an optical module having the optical receptacle.

BACKGROUND ART

In optical communication using optical fiber, optical modules have been used that have light emitting elements for transmission or reception. An optical module has an optical receptacle that optically couples light emitting elements or light receiving elements and the end faces of optical fibers. In the optical module at a transmission side, the optical receptacle causes light (hereinafter, called "signal light") that includes communication information and is emitted from the light emitting elements to be incident on the end faces of the optical fibers. In the optical module at a reception side, the optical receptacle guides the signal light emitted from the end faces of the optical fibers to the light receiving elements. The optical receptacle that collectively couples a plurality of light emitting elements or light receiving elements and the end faces of a plurality of optical fibers has a plurality of lens faces arranged at predetermined pitches, and therefore, may be called a lens array.

Some of the optical modules at the transmission side have light receiving elements for monitoring output of the light emitted from light emitting elements, in addition to the light emitting elements. The optical receptacle for use in such a light module is configured to emit a part of the light emitted from the light emitting elements toward the light receiving elements for monitoring as monitor light (see PTL 1, for example).

FIG. 1A is a sectional view of the lens array described in PTL 1. As illustrated in FIG. 1A, lens array 10 described in PTL 1 includes lens array main body 20, lens member 30 and filler 40. Lens array main body 20 and lens member 30 are formed of resin with optical transparency. Filler 40 is an adhesive with optical transparency having the same refractive index as the resin composing lens array main body 20. In lens array main body 20, a plurality of first lens faces 21, first reflection surface 22, second reflection surface 23, half-mirror layer 24, and a plurality of second lens faces 25 are formed. In the bottom of lens array main body 20, recess 26 is formed that is to be filled with filler 40 and that is for lens member 30 to be inserted therein. On an inclining surface located at the bottom of recess 26, a dielectric multilayer film is formed as half-mirror layer 24. Lens member 30 is inserted into recess 26, and has a plurality of third lens faces 31. Filler 40 fills a space formed between half-mirror layer 24 and lens member 30, and bonds lens array main body 20 and lens member 30 together.

FIG. 1B is a sectional view (a view of an optical path) of the optical module at the transmission side described in PTL 1. In this drawing, hatching onto a section of lens array 10 is not illustrated for the purpose of better illustrating the optical paths. As illustrated in FIG. 1B, optical module 50 at the transmission side has optoelectric converting device 60 for transmission, and lens array 10 illustrated in FIG. 1A. To a front face of lens array 10 (a face located at the left side in FIG. 1B), a plurality of optical fibers 70 are connected. Optoelectric converting device 60 for transmission has substrate 61, a plurality of light emitting elements 62, a plurality of light receiving elements 63 for monitoring and a plurality of control sections 64. A plurality of light emitting elements 62 are linearly arranged on substrate 61. A plurality of light receiving elements 63 are linearly arranged on the same surface of substrate 61 to be parallel with the line of light emitting elements 62. A plurality of light emitting elements 62 face corresponding first lens faces 21 of lens array 10. A plurality of light receiving elements 63 face corresponding third lens faces 31. A plurality of control sections 64 are linearly arranged on the same surface of substrate 61 so as to be located between light emitting elements 62 and light receiving elements 63. Control section 64 is connected to light emitting element 62 and light receiving element 63, and controls output of light emitting element 62 based on intensity or an amount of light of monitor light Lm that is received by light receiving element 63.

As illustrated in FIG. 1B, light L emitted from light emitting element 62 enters lens array 10 from first lens face 21, is sequentially reflected on first reflection surface 22 and second reflection surface 23, and reaches half-mirror layer 24. On half-mirror layer 24, a part of light L passes through half-mirror layer 24 to be monitor light Lm, and a part of light L is reflected to be signal light Ls. Monitor light Lm sequentially passes through filler 40 and lens member 30, is emitted to outside lens array 10 from third lens face 31, and reaches light receiving element 63. Signal light Ls is emitted to the outside of lens array 10 from second lens face 25 to reach an end face of optical fiber 70.

As described above, lens array 10 described in PTL 1 can split light L emitted from light emitting element 62 into monitor light Lm and signal light Ls, and emit monitor light Lm toward light receiving element 63, by using half-mirror layer 24. In lens array 10, recess 26 is filled with filler 40 with the same refractive index as that of lens array main body 20 so that light L is not totally reflected on half-mirror layer 24. In order to guide monitor light Lm to light receiving element 63 properly, lens member 30 is disposed in recess 26.

CITATION LIST

Patent Literature

PTL 1:
Japanese Patent Application Laid-Open No. 2012-194454

SUMMARY OF INVENTION

Technical Problem

The optical receptacle (lens array) described in PTL 1 has the problem of high production cost, because the optical receptacle consists of a plurality of members and the production process thereof is complicated. Specifically, in order to produce optical receptacle (lens array) 10 described in PTL 1, it is necessary to 1) form lens array main body 20, 2) form half-mirror layer 24 in a predetermined position in recess 26 of lens array main body 20, 3) fill recess 26 with a suitable amount of filler 40 so that air is not included in recess 26, and 4) dispose lens member 30 so that air is not included in recess 26. Since the optical receptacle described in PTL 1 consists of a plurality of members and the production process is complicated as described above, production cost reduction is difficult.

An object of the present invention is to provide an optical receptacle that can generate a monitor light and also can be produced by integral molding, and an optical module having the optical receptacle.

Solution to Problem

In order to attain the above described object, an optical receptacle according to the present invention is an optical receptacle to be disposed between an optoelectric converting device and an optical fiber, the optoelectric converting device having a light emitting element and a light receiving element for monitoring light emitted from the light emitting element, the optical receptacle being for optically coupling the light emitting element and an end face of the optical fiber, the optical receptacle including:

at least one first optical face on which the light emitted from the light emitting element is incident;

a reflection surface that reflects light incident on the first optical face to the light receiving element;

a light splitting section that splits the light reflected by the reflection surface into monitor light heading for the light receiving element and signal light heading for the end face of the optical fiber, emits the monitor light toward the light receiving element, and reflects the signal light to the end face of the optical fiber; and at least one second optical face that emits the signal light reflected by the light splitting section toward the end face of the optical fiber, wherein the light splitting section has divided transmission surfaces that allow the light reflected by the reflection surface to pass through, and emit the light toward the light receiving element, and divided reflection surfaces that are formed in a different region from the divided transmission surfaces and reflect the light reflected by the reflection surface to the second optical face, and the divided reflection surfaces are inclining surfaces with respect to an optical axis of the light reflected by the reflection surface.

An optical module according to the present invention has an optoelectric converting device having at least one light emitting element and at least one light receiving element for monitoring light emitted from the light emitting element, and the optical receptacle according to the present invention.

Advantageous Effects of Invention

According to the present invention, an optical receptacle that can generate monitor light and an optical module having the optical receptacle can be produced at low cost.

BRIEF DESCRIPTION OF DRAWINGS

FIGS. 3A to 3D are diagrams each illustrating a configuration of an optical receptacle according to one embodiment of the present invention;

DESCRIPTION OF EMBODIMENTS

Hereinafter, an embodiment according to the present invention will be described in detail with reference to the accompanying drawings. In the following explanation, as a typical example of an optical receptacle according to the present invention, an optical receptacle (a lens array) for optically coupling a plurality of light emitting elements and end faces of a plurality of optical fibers at a time will be described.

Configuration of Optical Module

Figure 1A:
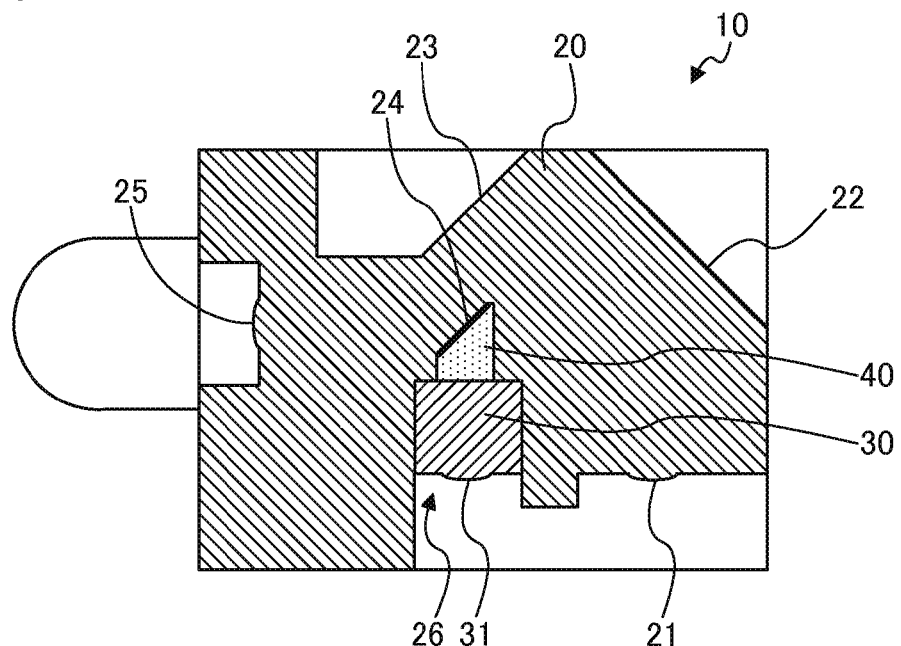
FIG. 1A is a sectional view of a lens array described in PTL 1.
Figure 1B:
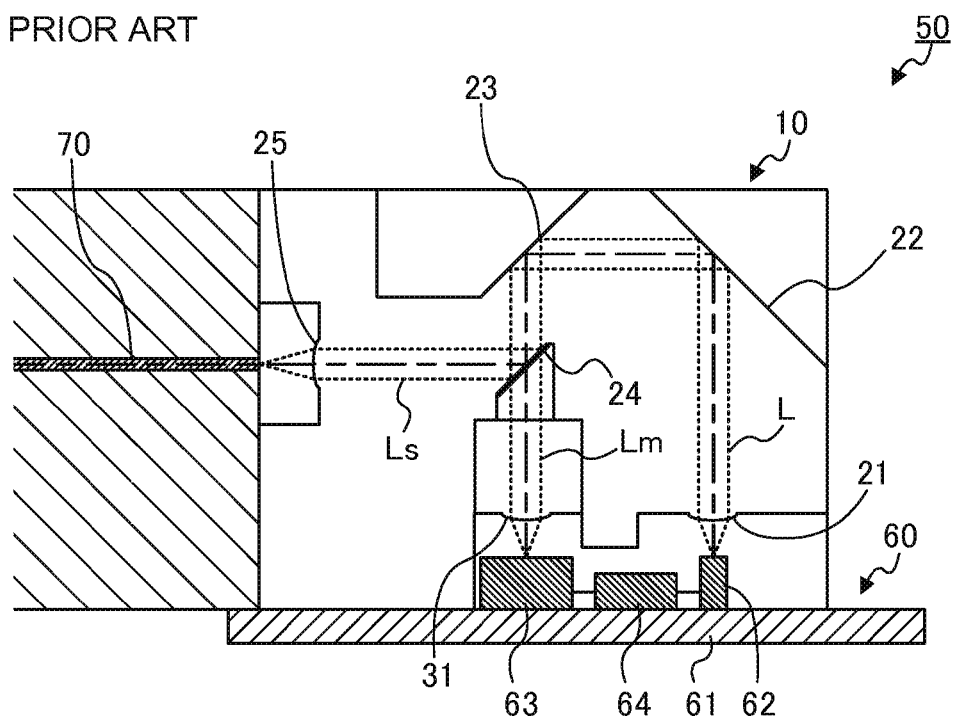
FIG. 1B is a sectional view (view of an optical path) of an optical module described in PTL 1.
Figure 2:
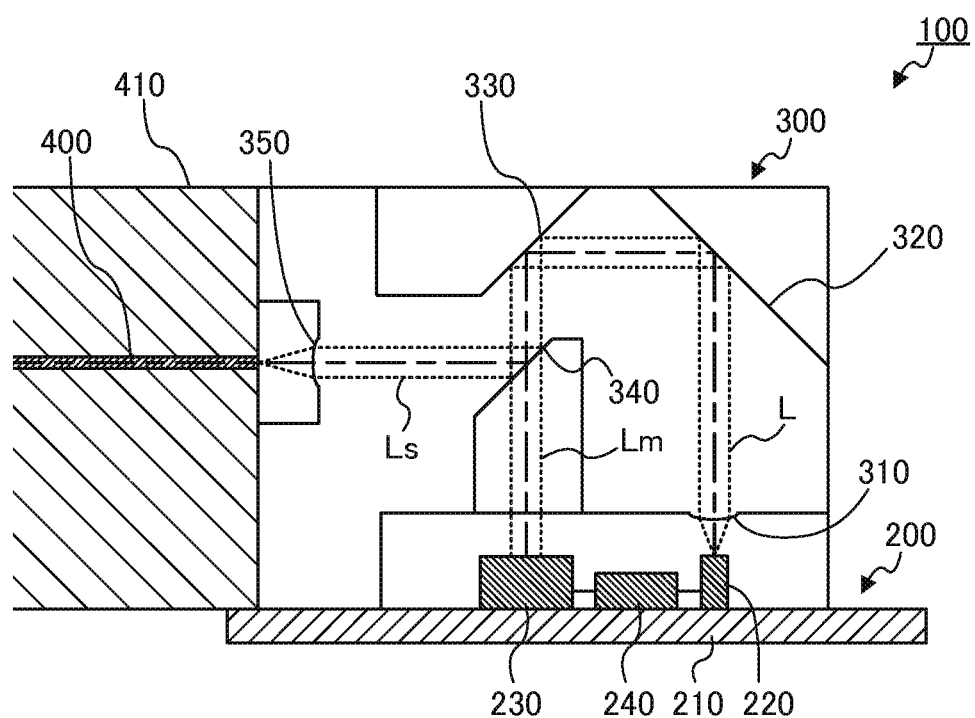
FIG. 2 is a sectional view (view of an optical path) of an optical module at a transmission side according to one embodiment of the present invention.

FIG. 2 is a sectional view (a view of an optical path) of an optical module at a transmission side according to one embodiment of the present invention. In the drawing, hatching onto a section of optical receptacle 300 is not illustrated in order to better illustrate the optical path in optical receptacle 300 (refer to FIG. 3D). In the following explanation, optical receptacle 300 will be described with a face on a side of optical fiber 400 referred to as "a front face", and a face on a side of optoelectric converting device 200 referred to as "a bottom face".

As illustrated in FIG. 2, optical module 100 has optoelectric converting device 200 for transmission having a plurality of light emitting elements 220, and optical receptacle 300 disposed on optoelectric converting device 200. In use, a plurality of optical fibers 400 are connected to the front face (the face located at a left side in FIG. 2) of optical receptacle 300. Specifically, optical receptacle 300 is disposed between optoelectric converting device 200 and a plurality of optical fibers 400. Optical receptacle 300 optically couples each of a plurality of light emitting elements 220 of optoelectric converting device 200 and each of end faces of a plurality of optical fibers 400.

Optoelectric converting device 200 for transmission has substrate 210, a plurality of light emitting elements 220, a plurality of light receiving elements 230 for monitoring and a plurality of control sections 240.

A plurality of light emitting elements 220 are linearly arranged on substrate 210, and emit laser light L in a direction perpendicular to the substrate surface. In FIG. 2, a plurality of light emitting elements 220 are linearly arranged in a direction going away from the plane of the paper. For example, light emitting element 220 is a vertical cavity surface emitting laser (VCSEL).

A plurality of light receiving elements 230 receive monitor light Lm for monitoring outputs of corresponding light emitting elements 220. A plurality of light receiving elements 230 are linearly arranged on the same surface of substrate 210 so as to be parallel with the line of light emitting elements 220. A plurality of light emitting elements 220 and a plurality of light receiving elements 230 are disposed at the same pitches so as to correspond to one another. When the outputs of all of light emitting elements 220 do not have to be monitored, the number of light receiving elements 230 may be smaller than the number of light emitting elements 220. In the present embodiment, the number of light emitting elements 220 and the number of light receiving elements 230 are the same. Light receiving element 230 is, for example, a photodetector.

A plurality of control sections 240 are linearly arranged on the same surface of substrate 210 so as to be located between a plurality of light emitting elements 220 and a plurality of light receiving elements 230. Control section 240 is connected to corresponding light emitting element 220 and corresponding light receiving element 230, and controls the output of light emitting element 220 based on intensity or an amount of light of monitor light Lm that is received by light receiving element 230. Control section 240 is, for example, a driver IC.

Optical receptacle 300 is disposed on optoelectric converting device 200 in such a manner that a plurality of first lens faces 310 (first optical faces) and a plurality of light emitting elements 220 face one another, and light splitting section 340 and a plurality of light receiving elements 230 face each other. Optical receptacle 300 is formed of a material with optical transparency, and is produced as a single piece by injection molding, for example. Optical receptacle 300 causes light L that is emitted from light emitting element 220 of optoelectric converting device 200 to enter the inside from first lens face 310 and split light L into monitor light Lm and signal light Ls. Optical receptacle 300 emits monitor light Lm toward light receiving element 230 of optoelectric converting device 200 from light splitting section 340, and emits signal light Ls toward the end face of optical fiber 400 from second lens face 350 (a second optical face).

As will be described below, a pair of fitting bores 380 (bottomed recesses) are formed in optical receptacle 300 (refer to FIG. 3B). A pair of protrusions (not illustrated) that are formed on substrate 210 (or another member fixed to substrate 210) of optoelectric converting device 200 are inserted into fitting bores 380, whereby optical receptacle 300 is positioned on optoelectric converting device 200. Further, optical receptacle 300 is fixed to optoelectric converting device 200 with use of a clamp spring, an adhesive or the like.

Optical module 100 of the present embodiment is mainly characterized by the configuration of optical receptacle 300. Therefore, optical receptacle 300 will be additionally described in detail again.

As many optical fibers 400 as light emitting elements 220 are connected to optical receptacle 300. A plurality of optical fibers 400 are linearly arranged at the same pitches as light emitting elements 220. In FIG. 2, a plurality of optical fibers 400 are linearly arranged in a direction going away from the plane of the paper. For example, a plurality of optical fibers 400 are optical fibers of the same sizes of a single mode type or a multi mode type. End portions of a plurality of optical fibers 400 are held in multi-fiber bundled type connector 410 such as an MT connector. Connector 410 is fixed to optical receptacle 300 with use of fixing means (not illustrated) such as a clamp spring with an end surface thereof in contact with the front face of optical receptacle 300.

Configuration of Optical Receptacle

Figure 4A:
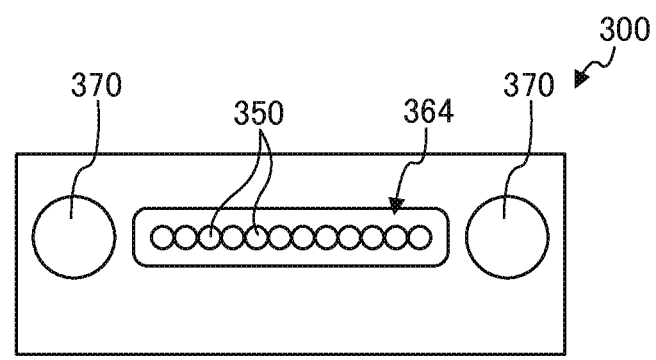
FIGS. 4A and 4B are diagrams each illustrating the configuration of the optical receptacle according to one embodiment of the present invention.
Figure 4B:
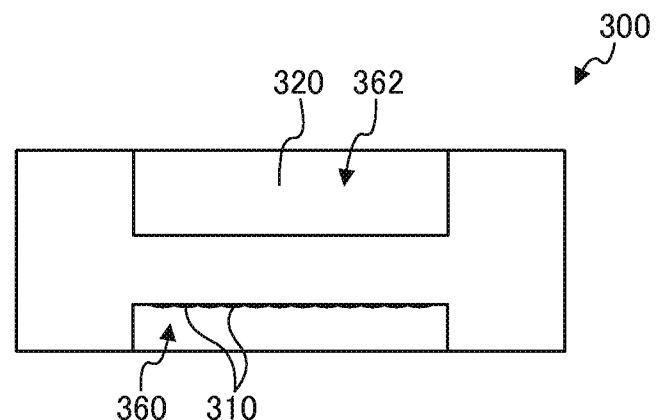

Next, the configuration of optical receptacle 300 will be described. FIGS. 3A to 3D, and FIGS. 4A and 4B are diagrams illustrating the configuration of optical receptacle 300. FIG. 3A is a plan view, FIG. 3B is a bottom view, FIG. 3C is a side view, and FIG. 3D is a sectional view taken along line D-D shown in FIGS. 3A and 3B. FIG. 4A is a front view, and FIG. 4B is a rear view.

As illustrated in FIGS. 3A to 3D, and FIGS. 4A and 4B, optical receptacle 300 is a member in a substantially rectangular parallelepiped shape. Optical receptacle 300 is formed of a material that is optically transparent to light of wavelengths used in optical communication. Examples of such material include transparent resins such as polyetherimides and cyclic olefin resins. Optical receptacle 300 can be produced as a single piece by injection molding, for example.

First, the shape of optical receptacle 300 will be described based on six faces (top face, bottom face, front face, rear face, right side face, and left side face) of the rectangular parallelepiped.

As illustrated in FIGS. 3B, 3D and 4B, first recess 360 in a rectangular parallelepiped shape is formed in a central portion of the bottom face. First recess 360 is a space for accommodating a plurality of light emitting elements 220, a plurality of light receiving elements 230 and a plurality of control sections 240 (see FIG. 2). A plurality of first lens faces 310 (the first optical faces) are formed on the bottom face of first recess 360 (face located at an upper side in FIG. 3D) to face a plurality of corresponding light receiving elements 230. Second recess 361 in a substantially pentagonal prism shape is formed in a position facing a plurality of light receiving elements 230 on the bottom face of first recess 360 (see FIGS. 3B and 3D). A part of an inner face of second recess 361 functions as light splitting section 340. First lens face 310 and light splitting section 340 will be described later.

As illustrated in FIGS. 3A, 3D and 4B, in a part at a rear face side of the top face, third recess 362 in a triangular prism shape is formed by chamfering corners consisting of the top face and the rear face. An inclining surface constituting third recess 362 functions as first reflection surface 320. Further, in a central part of the top face, fourth recess 363 in a pentagonal prism shape is also formed. An inclining surface constituting fourth recess 363 functions as second reflection surface 330. First reflection surface 320 and second reflection surface 330 will be described later.

As shown in FIGS. 3D and 4A, in a central part of the front face, fifth recess 364 in a substantially rectangular parallelepiped shape is formed. On a bottom face (a face located at a right side in FIG. 3D) of fifth recess 364, a plurality of second lens faces 350 (second optical faces) are formed so as to face respective end faces of a plurality of optical fibers 400. Second lens face 350 will be described below.

A pair of protrusions 370 for positioning the end faces of a plurality of optical fibers 400 are formed at both left and right sides of the front face. Protrusion 370 is in a shape with a circular column and a semisphere combined with each other. A pair of protrusions 370 are inserted into bores formed in connector 410 (for example, bores conforming to standards of F12 type muli-fiber connector (IEC 61754-5, JIS C 5981)). Thereby, the end face of optical fiber 400 can be positioned to optical receptacle 300.

As illustrated in FIG. 3B, at both left and right sides of the rectangular parallelepiped, a pair of fitting bores 380 for positioning optical receptacle 300 are formed. Fitting bore 380 is in a circular column shape. In fitting bores 380, a pair of protrusions provided at optoelectric converting device 200 are inserted. Thereby, optical receptacle 300 can be positioned to optoelectric converting device 200. Fitting bores 380 are also usable for inspection purposes such as inspection of use efficiency or coupling efficiency of light, and inspection of whether or not monitor light Lm has been properly split.

Next, optical components of optical receptacle 300 will be described.

As illustrated in FIGS. 2 to 4A and 4B, optical receptacle 300 has a plurality of first lens faces 310, first reflection surface 320, second reflection surface 330, light splitting section 340, and a plurality of second lens faces 350.

A plurality of first lens faces 310 (first optical faces) are convex lens faces circular in plan view, which are formed on a bottom face side of optical receptacle 300 to face light emitting elements 220 of optoelectric converting device 200. First lens face 310 may be a spherical surface, or may be an aspherical surface. The number of first lens faces 310 is usually the same as the number of light emitting elements 220. A plurality of first lens faces 310 are linearly arranged to be parallel with the line of light emitting elements 220 at the same pitches as those of light emitting elements 220 (see FIG. 3B). Two first lens faces 310 which are adjacent to each other may or may not be in contact with each other.

A plurality of first lens faces 310 cause light L emitted from corresponding light emitting elements 220 to enter optical receptacle 300 (see FIG. 2). At this time, first lens face 310 converts incident light L into collimated light. Collimated light L moves forth toward first reflection surface 320. In the present embodiment, the central axis of first lens face 310 is perpendicular to the bottom face of optical receptacle 300 and an emission surface of light emitting element 220. The central axis of first lens face 310 and an optical axis of the light L emitted from light emitting element 220 preferably coincide with each other.

First reflection surface 320 and second reflection surface 330 are inclining surfaces that are formed on the top face side of optical receptacle 300. First reflection surface 320 inclines to be closer to the front face (the face at the side of optical fiber 400) toward the top face from the bottom face of optical receptacle 300. Conversely, second reflection surface 330 inclines to be closer to the front face toward the bottom face from the top face of optical receptacle 300. On first reflection surface 320 and second reflection surface 330, a reflection film formed of Au, Ag, Al or the like may be formed.

Collimated light L that is incident on first lens faces 310 is incident on first reflection surface 320 from the inside of optical receptacle 300 at an incident angle larger than a critical angle. First reflection surface 320 totally reflects incident light L to second reflection surface 330. Light L reflected by first reflection surface 320 is incident on second reflection surface 330 from the inside of optical receptacle 300 at an incident angle larger than the critical angle. Second reflection surface 330 totally reflects incident light L toward light splitting section 340 and light receiving elements 230. Specifically, first reflection surface 320 and second reflection surface 330 reflect light L incident on first lens faces 310 toward light receiving elements 230 (see FIG. 2). In the present embodiment, an inclination angle of first reflection surface 320 is 45° to the optical axis of light L incident on first lens faces 310. An inclination angle of second reflection surface 330 is 45° to the optical axis of light L reflected by first reflection surface 320.

Light splitting section 340 is a region that is formed in optical receptacle 300, and consists of a plurality of faces. As described above, light splitting section 340 is formed as an inner surface of second recess 361. Light splitting section 340 splits light L reflected by second reflection surface 330 into monitor light Lm toward light receiving elements 230, and signal light Ls toward the end faces of optical fibers 400, emits monitor light Lm toward light receiving elements 230, and reflects signal light Ls toward the end faces of optical fibers 400 (see FIG. 2).

Figure 5A:
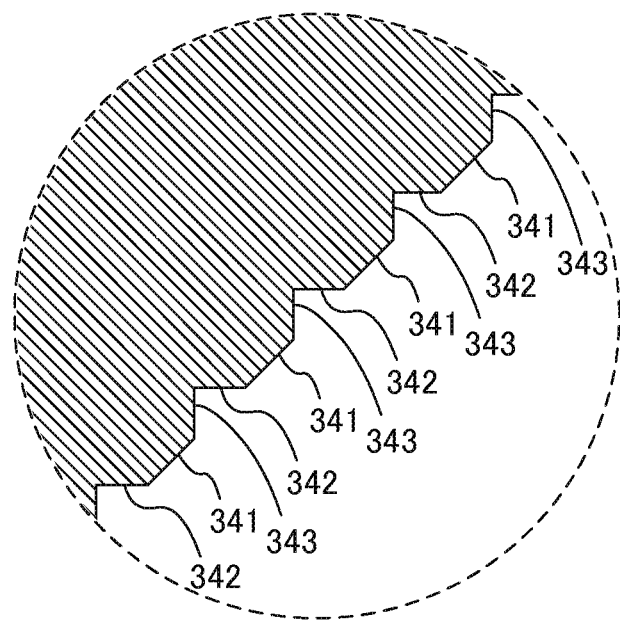
FIGS. 5A and 5B are partially enlarged views each illustrating a configuration of a light splitting section.
Figure 5B:
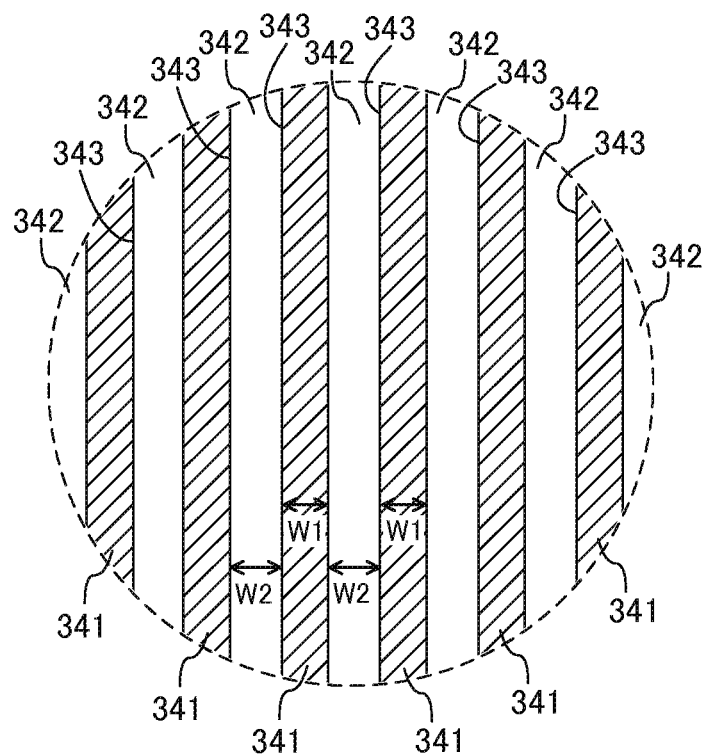

FIGS. 5A and 5B are partially enlarged views each illustrating a configuration of light splitting section 340. FIG. 5A is a partially enlarged sectional view of a region illustrated by a broken line in FIG. 3D. FIG. 5B is a partially enlarged plan view of light splitting section 340 seen from a side of second reflection surface 330. In FIG. 5B, divided reflection surfaces 341 are hatched.

As illustrated in FIGS. 5A and 5B, light splitting section 340 has a plurality of divided reflection surfaces 341, a plurality of divided transmission surfaces 342 and a plurality of level difference surfaces 343. Divided reflection surface 341 is an inclining surface with respect to the optical axis of light L reflected by second reflection surface 330. Divided reflection surface 341 inclines to be closer to the front face toward the bottom face from the top face of optical receptacle 300. In the present embodiment, an inclination angle of divided reflection surface 341 is 45° to the optical axis of light L reflected by the second reflection surface 330. Divided reflection surfaces 341 are divided in the inclining direction of divided reflection surfaces 341 and are disposed at predetermined spaces. Divided transmission surface 342 is a surface formed in a position different from divided reflection surface 341, and is a vertical surface to the optical axis of light L reflected by second reflection surface 330 in the present embodiment. Divided transmission surfaces 342 are also divided in the inclining direction of divided reflection surfaces 341, and are disposed at predetermined spaces. As illustrated in FIG. 5B, divided reflection surfaces 341 and divided transmission surfaces 342 are alternately disposed when seen from the side of second reflection surface 330. A plurality of level difference surfaces 343 are surfaces that are parallel with the optical axis of light L reflected by second reflection surface 330, and connect divided reflection surfaces 341 and divided transmission surfaces 342.

Figure 6:
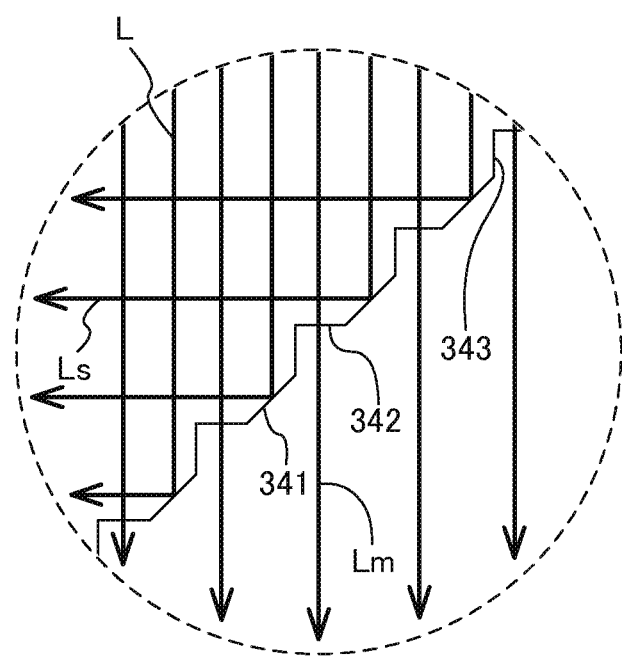
FIG. 6 is a partially enlarged sectional view illustrating an optical path of the light splitting section.

FIG. 6 is a partially enlarged sectional view illustrating an optical path of light splitting section 340. In the drawing, hatching onto the section of optical receptacle 300 is not illustrated in order to better illustrate the optical paths in optical receptacle 300 (see FIG. 5A). As illustrated in FIG. 6, light L reflected by second reflection surface 330 is internally incident on divided reflection surface 341 at an incident angle larger than the critical angle. Divided reflection surface 341 reflects incident light L to second lens face 350, and generates signal light Ls. Divided transmission surface 342 allows light L reflected by second reflection surface 330 to pass through, and generates monitor light Lm toward light receiving element 230. At this time, monitor light Lm is not refracted, because divided transmission surface 342 is a perpendicular surface to light L. Note that light L is not incident on level difference surface 343, because level difference surface 343 is formed parallel with the incident direction of light L.

Second lens face 350 (second optical face) is a convex lens face that is circular in plan view, which is formed at the front face side of optical receptacle 300 to face the end face of optical fiber 400. Second lens face 350 may be a spherical surface, or may be an aspherical surface. The number of second lens faces 350 is usually the same as the number of first lens faces 310. A plurality of second lens faces 350 are parallel with the line of first lens faces 310 and a line of optical fibers 400, and are linearly arranged to be at the same pitches as those of first lens faces 310 and optical fibers 400 (see FIG. 4A). Two second lens faces 350 that are adjacent to each other may or may not be in contact with each other.

Signal light Ls reflected by light splitting section 340 is incident on second lens face 350. At this time, the central axis of second lens face 350 and central axis of signal light Ls reflected by light splitting section 340 preferably coincide with each other. In the present embodiment, the central axis of second lens face 350 is parallel with the bottom face of optical receptacle 300 and an emission surface of light emitting element 220. Second lens face 350 converges incident signal light Ls, and emits incident signal light Ls toward the end face of optical fiber 400.

As described above, light L which is emitted from light emitting element 220 enters optical receptacle 300 from corresponding first lens face 310. Light L which is incident on first lens face 310 is sequentially reflected on first reflection surface 320 and the second reflection surface, and heads for light splitting section 340. A park of light L that reaches light splitting section 340 is reflected by divided reflection surface 341 (the inclining surface) to be signal light Ls heading for second lens face 350. The other part of light L reaching light splitting section 340 passes through divided transmission surface 342 (the perpendicular surface) to be monitor light Lm heading for light receiving element 230. Signal light Ls is emitted from second lens face 350 to reach the end face of optical fiber 400. Monitor light Lm directly reaches light receiving element 230. Thereby, each of a plurality of light emitting elements 220 and the end face of each of a plurality of optical fibers 400 are optically coupled via first lens face 310 and second lens face 350.

Note that in optical receptacle 300 of the present embodiment, a ratio of amounts of light of monitor light Lm and signal light Ls can be easily changed. Specifically, the ratio of the amounts of light of monitor light Lm and signal light Ls can be easily changed by changing a ratio of areas of divided reflection surface 341 and divided transmission surface 342 in the case of seeing light splitting section 340 from the side of second reflection surface 330 as illustrated in FIG. 5B. For example, when the amount of light of signal light Ls is desired to be increased, width W1 of divided reflection surface 341 illustrated in FIG. 5B can be increased, and width W2 of divided transmission surface 342 can be reduced.

Effect

Optical receptacle 300 according to the present embodiment has monolithic structure and can be easily produced by injection molding or the like because formation of a reflection film and the like is not required. Accordingly, optical receptacle 300 and optical module 100 according to the present embodiment can be produced at low cost.

Further, optical receptacle 300 according to the present embodiment also can limit a yield reduction when it is produced by injection molding. When optical receptacle 300 according to the present embodiment is produced by injection molding, the die for molding light splitting section 340 moves in a direction parallel with level difference surface 343 to be released (see FIG. 5A). Therefore, even though level difference surface 343 that does not have an optical function may be damaged, divided reflection surface 341 and divided transmission surface 342 that have optical functions are hardly damaged. Accordingly, optical receptacle 300 according to the present embodiment can be produced at a high yield.

As illustrated in FIG. 5A, in optical receptacle 300 according to the present embodiment, an acute angle is not provided around divided reflection surface 341. Therefore, even if poor filling of a resin occurs at the time of production, the shape of divided reflection surface 341 hardly changes, even though the shape of divided transmission surface 342 or level difference surface 343 may change. If the shape of divided reflection surface 341 changes, it becomes a serious problem because quality of the signal light which is important in performing optical communication is reduced, but change in the shape of divided transmission surface 342 or level difference surface 343 does not become a serious problem. From this point of view, optical receptacle 300 according to the present embodiment also can limit a yield reduction when it is produced by injection molding.

Modification

Figure 7A:
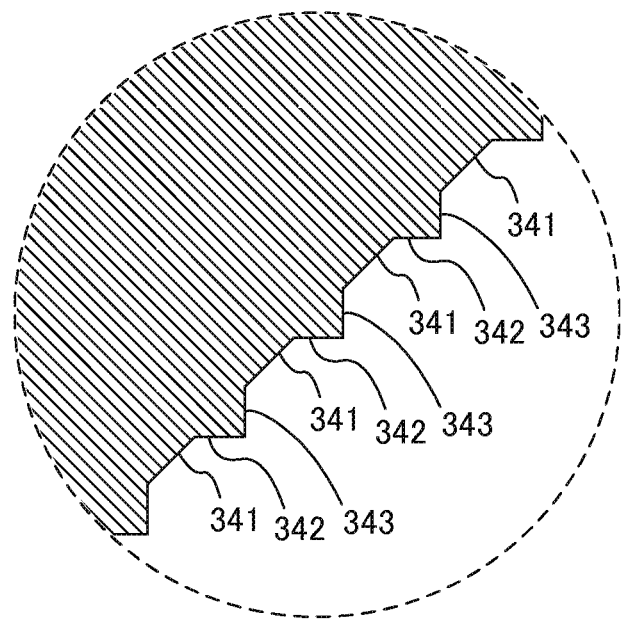
FIGS. 7A and 7B are partially enlarged views each illustrating a modification of the light splitting section.
Figure 7B:
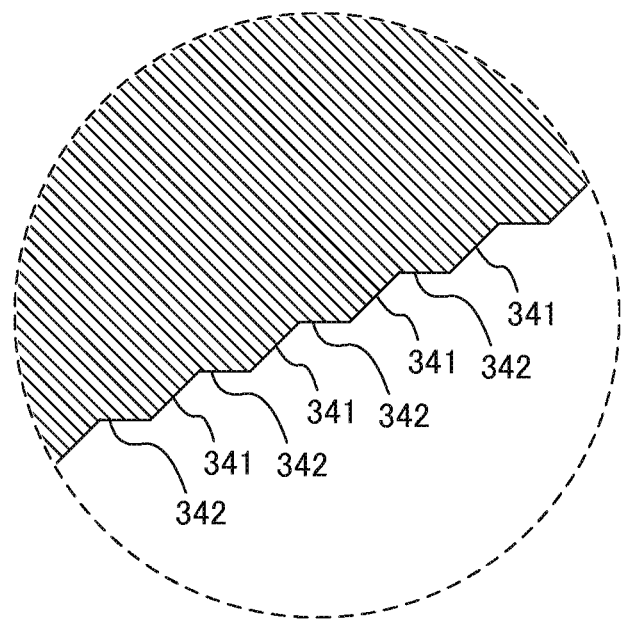

FIGS. 7A and 7B are partially enlarged views each illustrating a configuration of a modification of light splitting section 340. As illustrated in FIG. 7A, a plurality of divided reflection surfaces 341 are disposed on the same virtual plane, and divided transmission surfaces 342 and level difference surfaces 343 may be formed to protrude to a side of second recess 361 (outside) with respect to divided reflection surfaces 341 (virtual plane). Further, as illustrated in FIG. 7B, divided reflection surfaces 341 and divided transmission surfaces 342 may be alternately disposed continuously without level difference surfaces 343 interposed therebetween. Although not illustrated here, divided reflection surface 341 and divided transmission surface 342 may be divided in the inclining direction of divided reflection surface 341 and a direction orthogonal to a traveling direction of monitor light Lm (a direction parallel with the line of second lens faces 350). In either case, it is possible to attain an effect similar to that of light splitting section 340 illustrated in FIG. 5A.

Figure 8:
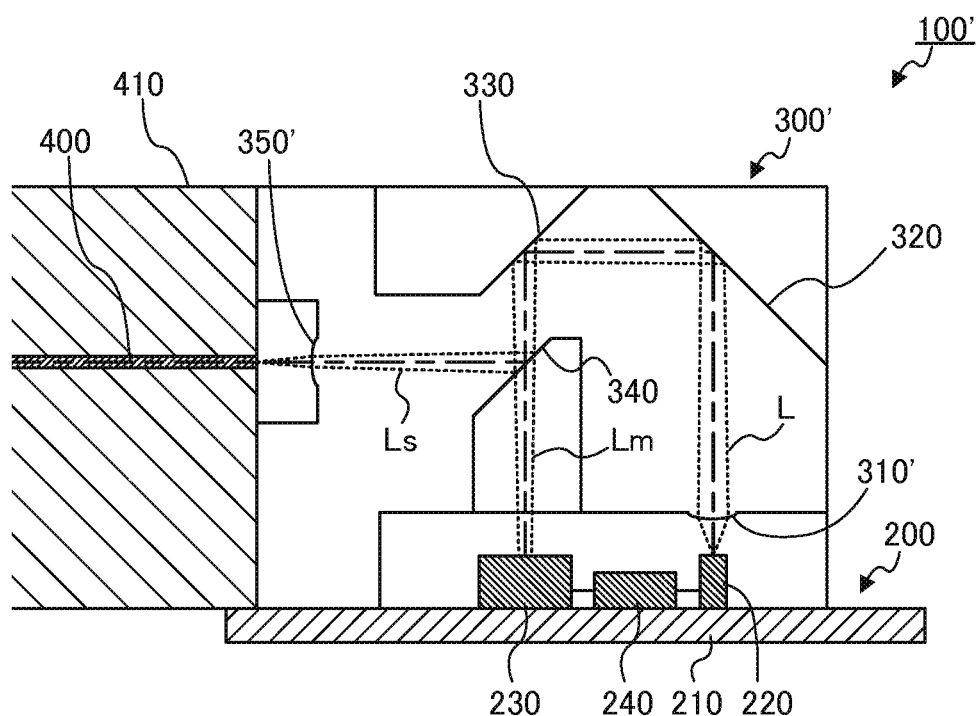
FIG. 8 is a sectional view of a modification of the optical module according to one embodiment of the present invention.

FIG. 8 is a sectional view of optical module 100' according to a modification. As illustrated in FIG. 8, first lens face 310' may convert light L emitted from light emitting element 220 into non-collimated light. In this case, first lens face 310' may convert light L into non-collimated light with a light flux diameter gradually increasing, or may convert light L into non-collimated light with a light flux diameter gradually decreasing. From the viewpoint of improving light reception efficiency in light receiving element 230, first lens face 310' preferably converts light L into non-collimated light with the light flux diameter gradually decreasing (see FIG. 8).

Note that optical receptacle 300 according to the above described embodiment is also usable in an optical module on a light reception side. In this case, an opto electric converting device for reception has a plurality of light receiving elements for receiving signal light instead of a plurality of light emitting elements. The light receiving elements are disposed in the same positions as the light emitting elements. The optoelectric converting device for reception does not have light receiving elements for receiving monitor light and control sections for controlling outputs of the light emitting elements. In the optical module on the reception side, signal light Ls enters optical receptacle 300 from second lens face 350. Signal light Ls is sequentially reflected on light splitting section 340, second reflection surface 330 and first reflection surface 320, and is emitted toward the light receiving element from first lens face 310. At this time, a part of the light passes through level difference surface 343 in light splitting section 340, but do not reach the light receiving element, and therefore, there is no significant problem in reception.

In the above described embodiment, optical receptacle 300 (lens array) having a plurality of first lens faces 310 and a plurality of second lens faces 350 are described; however, any number of first lens faces 310 and any number of second lens faces 350 can be used. For example, optical receptacle 300 may have one each of first lens face 310 and second lens face 350.

While in the above described embodiment, first optical face 310 and second optical face 350 are lens faces (first lens face and second lens face) having curvatures, first optical face 310 and/or second optical face 350 may be a flat surface or flat surfaces as long as the function of the optical receptacle is not impaired. While in the above described embodiment, fitting bore 380 is a bottomed recess, a through-hole may be formed instead of fitting bore 380.

Figure 9A:
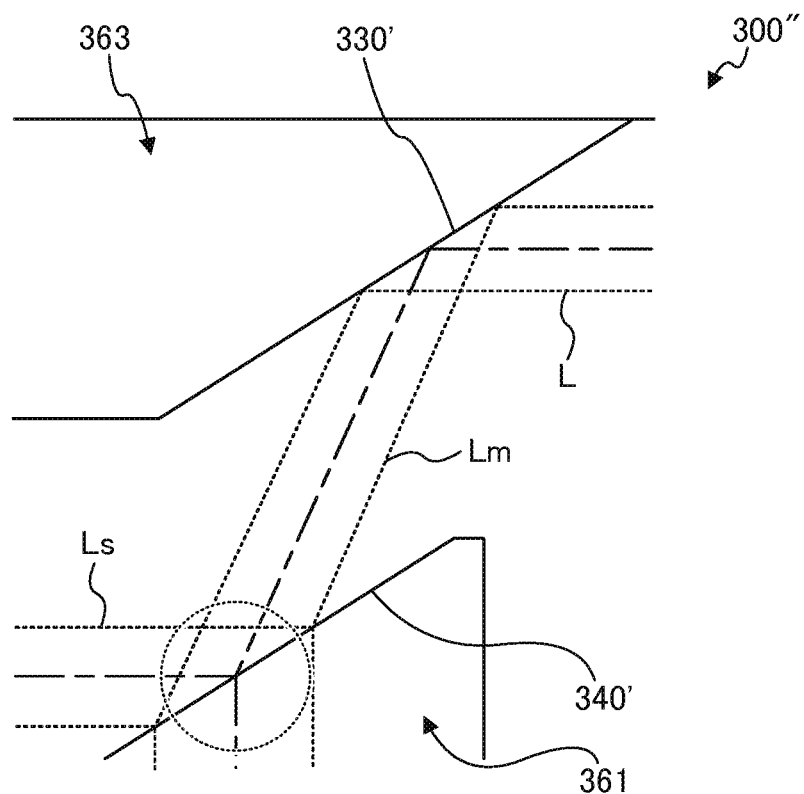
FIGS. 9A and 9B are partially enlarged sectional views of a modification of the optical receptacle according to one embodiment of the present invention.
Figure 9B:
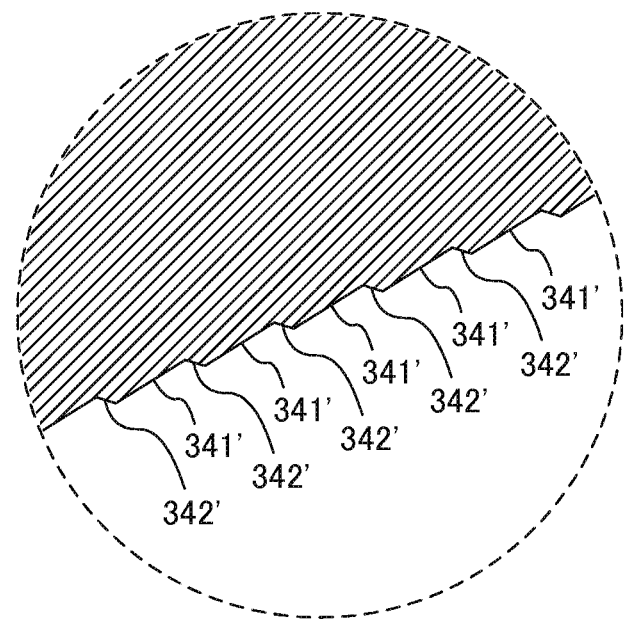
Figure 10A:
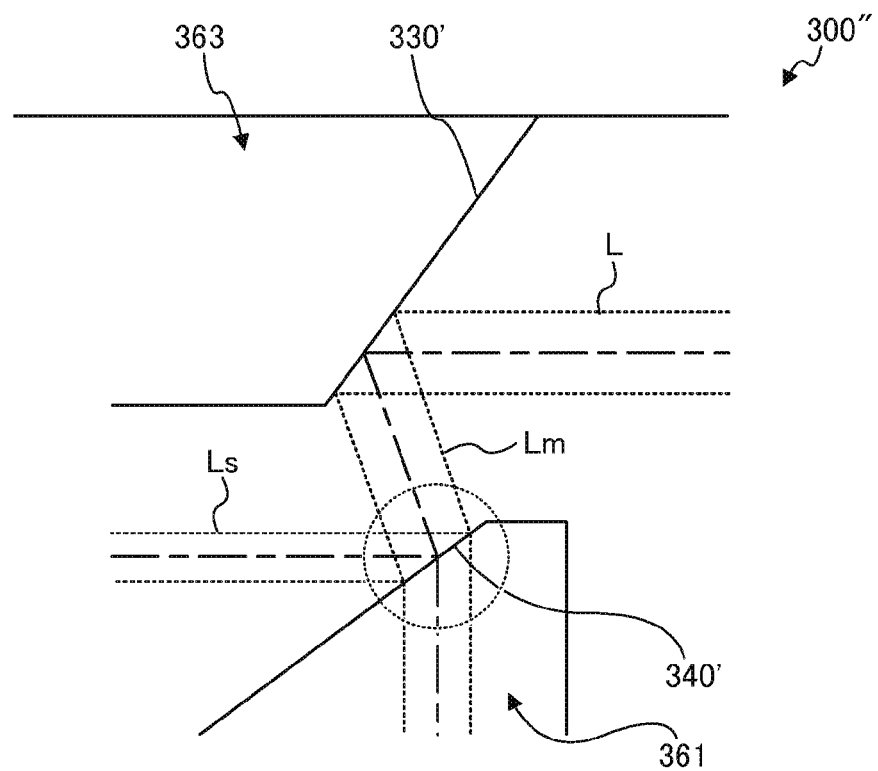
FIGS. 10A and 10B are partially enlarged sectional views of a modification of the optical receptacle according to one embodiment of the present invention.
Figure 10B:
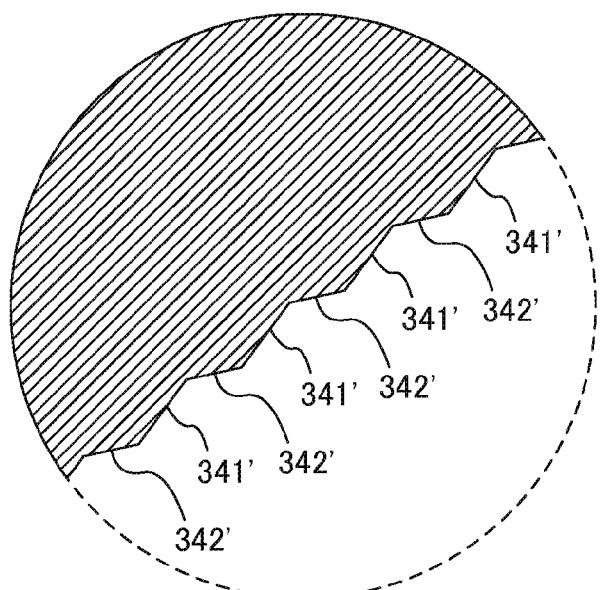

While in the above described embodiment, divided transmission surface 342 is a perpendicular surface to the optical axis of the light reflected by second reflection surface 330, divided transmission surface 342 may be an inclining surface with respect to the optical axis of the light reflected by second reflection surface 330. FIGS. 9A and 10A are partially enlarged sectional views of optical receptacles 300″ according to modifications. In the drawings, hatching onto sections of optical receptacles 300″ are not illustrated in order to better illustrate optical paths in optical receptacles 300″. FIGS. 9B and 10B are partially enlarged sectional views of regions illustrated by broken lines in FIGS. 9A and 10A, respectively. As illustrated in FIGS. 9B and 10B, divided transmission surfaces 342′ may be inclining surfaces with respect to optical axes of light reflected by second reflection surfaces 330′. In the modes illustrated in FIGS. 9A and 10A, an inclination angle of second reflection surface 330′ is less than 45° (FIG. 9A) or more than 45° (FIG. 10A) to the optical axis of light L reflected by first reflection surface 320. Note that when the optical axis of the light that passes through divided transmission surface 342′ may incline with respect to a light receiving surface of light receiving element 230, the inclination angle of second reflection surface 330′ may be 45° with respect to the optical axis of light L reflected by first reflection surface 320. Further, the same effect can be obtained if an inclination angle of first reflection surface 320 is changed, instead of changing the inclination angle of second reflection surface 330′.

INDUSTRIAL APPLICABILITY

The optical receptacle and the optical module according to the present invention is useful in optical communication using optical fibers.

REFERENCE SIGNS LIST

10 Lens array
20 Lens array main body
21 First lens face
22 First reflection surface
23 Second reflection surface
24 Half-mirror layer
25 Second lens face
26 Recess
30 Lens member
31 Third lens face
40 Filler
50 Optical module
60 Optoelectric converting device
61 Substrate
62 Light emitting element
63 Light receiving element
64 Control section
70 Optical fiber
100, 100′ Optical module
200 Optoelectric converting device
210 Substrate
220 Light emitting element
230 Light receiving element
240 Control section
300, 300′, 300″ Optical receptacle
310, 310′ First lens face (First optical face)
320 First reflection surface
330, 330′ Second reflection surface
340, 340′ Light splitting section
341, 341′ Divided reflection surface
342, 342′ Divided transmission surface
343 Level difference surface
350, 350′ Second lens face (second optical face)
360 First recess
361 Second recess
362 Third recess
363 Fourth recess
364 Fifth recess
370 Protrusion
380 Fitting bore
400 Optical fiber
410 Connector
L Light emitted from light emitting elements
Lm Monitor light
Ls Signal light

The invention claimed is:

1. An optical receptacle to be disposed between an optoelectric converting device and an optical fiber, the optoelectric converting device having a light emitting element and a light receiving element for monitoring light emitted from the light emitting element, the optical receptacle being for optically coupling the light emitting element and an end face of the optical fiber, the optical receptacle comprising:

at least one first optical face on which the light emitted from the light emitting element is incident;

a reflection surface that reflects light incident on the first optical face to the light receiving element;

a light splitting section that splits the light reflected by the reflection surface into monitor light heading for the light receiving element and signal light heading for the end face of the optical fiber, emits the monitor light toward the light receiving element, and reflects the signal light to the end face of the optical fiber; and at least one second optical face that emits the signal light reflected by the light splitting section toward the end face of the optical fiber, wherein the light splitting section has divided transmission surfaces that allow the light reflected by the reflection surface to pass through, and emit the light toward the light receiving element, divided reflection surfaces that are formed in a different region from the divided transmission surfaces and reflect the light reflected by the reflection surface to the second optical face, and level difference surfaces that are parallel surfaces to the optical axis of the light reflected by the reflection surface and each connect the divided transmission surface and the divided reflection surface, the divided reflection surfaces are inclining surfaces with respect to an optical axis of the light reflected by the reflection surface, the divided transmission surfaces and the divided reflection surfaces are both divided in an inclining direction of the divided reflection surfaces, and the divided transmission surfaces and the divided reflection surfaces are alternately disposed in the inclining direction.

2. The optical receptacle according to claim 1, wherein the divided reflection surfaces are disposed on a same virtual plane, and the divided transmission surfaces and the level difference surfaces are disposed outside from the virtual plane.

3. The optical receptacle according to claim 2, wherein the at least one first optical face includes a plurality of first optical faces linearly arranged, and the at least one second optical face includes a plurality of second optical faces linearly arranged.

4. An optical module comprising:
an optoelectric converting device having at least one light emitting element and at least one light receiving element for monitoring light emitted from the light emitting element; and
the optical receptacle according to claim 2.

5. The optical module according to claim 4, wherein
the at least one light emitting element includes a plurality of light emitting elements linearly arranged, and the at least one light receiving element includes a plurality of light receiving elements linearly arranged to be parallel with a line of the light emitting elements, and
the at least one first optical face of the optical receptacle includes a plurality of first optical faces linearly arranged corresponding to the line of the light emitting elements, and the at least one second optical face of the optical receptacle includes a plurality of second optical faces linearly arranged.

6. The optical receptacle according to claim 1, wherein the at least one first optical face includes a plurality of first optical faces linearly arranged, and the at least one second optical face includes a plurality of second optical faces linearly arranged.

7. An optical module comprising:
an optoelectric converting device having at least one light emitting element and at least one light receiving element for monitoring light emitted from the light emitting element; and
the optical receptacle according to claim 1.

8. The optical module according to claim 7, wherein
the at least one light emitting element includes a plurality of light emitting elements linearly arranged, and the at least one light receiving element includes a plurality of light receiving elements linearly arranged to be parallel with a line of the light emitting elements, and
the at least one first optical face of the optical receptacle includes a plurality of first optical faces linearly arranged corresponding to the line of the light emitting elements, and the at least one second optical face of the optical receptacle includes a plurality of second optical faces linearly arranged.

9. An optical receptacle to be disposed between an optoelectric converting device and an optical fiber, the optoelectric converting device having a light emitting element and a light receiving element for monitoring light emitted from the light emitting element, the optical receptacle being for optically coupling the light emitting element and an end face of the optical fiber, the optical receptacle comprising:
at least one first optical face on which the light emitted from the light emitting element is incident;
a reflection surface that reflects light incident on the first optical face to the light receiving element;
a light splitting section that splits the light reflected by the reflection surface into monitor light heading for the light receiving element and signal light heading for the end face of the optical fiber, emits the monitor light toward the light receiving element, and reflects the signal light to the end face of the optical fiber; and
at least one second optical face that emits the signal light reflected by the light splitting section toward the end face of the optical fiber, wherein
the light splitting section has divided transmission surfaces that allow the light reflected by the reflection surface to pass through, and emit the light toward the light receiving element, and divided reflection surfaces that are formed in a different region from the divided transmission surfaces and reflect the light reflected by the reflection surface to the second optical face, and
the divided reflection surfaces are inclining surfaces with respect to an optical axis of the light reflected by the reflection surface,
the divided transmission surfaces and the divided reflection surfaces are both divided in an inclining direction of the divided reflection surfaces, and
the divided transmission surfaces and the divided reflection surfaces are alternately disposed continuously in the inclining direction.

10. The optical receptacle according to claim 9, wherein the at least one first optical face includes a plurality of first optical faces linearly arranged, and the at least one second optical face includes a plurality of second optical faces linearly arranged.

11. An optical module comprising:
an optoelectric converting device having at least one light emitting element and at least one light receiving element for monitoring light emitted from the light emitting element; and
the optical receptacle according to claim 9.

12. The optical module according to claim 11, wherein
the at least one light emitting element includes a plurality of light emitting elements linearly arranged, and the at least one light receiving element includes a plurality of light receiving elements linearly arranged to be parallel with a line of the light emitting elements, and
the at least one first optical face of the optical receptacle includes a plurality of first optical faces linearly arranged corresponding to the line of the light emitting elements, and the at least one second optical face of the optical receptacle includes a plurality of second optical faces linearly arranged.

13. An optical receptacle to be disposed between an optoelectric converting device and an optical fiber, the optoelectric converting device having a light emitting element and a light receiving element for monitoring light emitted from the light emitting element, the optical receptacle being for optically coupling the light emitting element and an end face of the optical fiber, the optical receptacle comprising:
at least one first optical face on which the light emitted from the light emitting element is incident;
a reflection surface that reflects light incident on the first optical face to the light receiving element;
a light splitting section that splits the light reflected by the reflection surface into monitor light heading for the light receiving element and signal light heading for the end face of the optical fiber, emits the monitor light toward the light receiving element, and reflects the signal light to the end face of the optical fiber; and
at least one second optical face that emits the signal light reflected by the light splitting section toward the end face of the optical fiber, wherein
the light splitting section has divided transmission surfaces that allow the light reflected by the reflection surface to pass through, and emit the light toward the light receiving element, and divided reflection surfaces that are formed in a different region from the divided transmission surfaces and reflect the light reflected by the reflection surface to the second optical face, the divided reflection surfaces are inclining surfaces with respect to an optical axis of the light reflected by the reflection surface, and the divided transmission surfaces are perpendicular surfaces to the optical axis of the light reflected by the reflection surface.

14. The optical receptacle according to claim 13, wherein the at least one first optical face includes a plurality of first optical faces linearly arranged, and the at least one second optical face includes a plurality of second optical faces linearly arranged.

15. An optical module comprising:

an optoelectric converting device having at least one light emitting element and at least one light receiving element for monitoring light emitted from the light emitting element; and the optical receptacle according to claim 13.

16. The optical module according to claim 15, wherein the at least one light emitting element includes a plurality of light emitting elements linearly arranged, and the at least one light receiving element includes a plurality of light receiving elements linearly arranged to be parallel with a line of the light emitting elements, and the at least one first optical face of the optical receptacle includes a plurality of first optical faces linearly arranged corresponding to the line of the light emitting elements, and the at least one second optical face of the optical receptacle includes a plurality of second optical faces linearly arranged.

\* \* \* \* \*